United States Patent
Choi et al.

(10) Patent No.: US 8,480,123 B2
(45) Date of Patent: Jul. 9, 2013

(54) CENTER AIRBAG CUSHION AND CENTER AIRBAG MODULE HAVING THE SAME

(75) Inventors: Jae Ho Choi, Seoul (KR); Hyeong Ho Choi, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 255 days.

(21) Appl. No.: 12/955,669

(22) Filed: Nov. 29, 2010

(65) Prior Publication Data

US 2011/0309603 A1  Dec. 22, 2011

(30) Foreign Application Priority Data

Jun. 16, 2010 (KR) .......................... 10-2010-0057188

(51) Int. Cl.
*B60R 21/16* (2006.01)

(52) U.S. Cl.
USPC .................. 280/730.2; 280/730.1; 280/743.1; 280/743.2

(58) Field of Classification Search
USPC ....................... 280/730.2, 730.1, 743.2, 743.1
See application file for complete search history.

(56) References Cited

U.S. PATENT DOCUMENTS

| | | | | |
|---|---|---|---|---|
| 3,791,667 | A * | 2/1974 | Haviland | 280/730.2 |
| 7,360,790 | B2 * | 4/2008 | Hasebe et al. | 280/743.2 |
| 7,625,008 | B2 * | 12/2009 | Pang et al. | 280/743.1 |
| 8,141,900 | B2 * | 3/2012 | Yamazaki | 280/736 |
| 8,181,988 | B2 * | 5/2012 | Adachi et al. | 280/729 |
| 2010/0140909 | A1 * | 6/2010 | Jang | 280/743.1 |

* cited by examiner

*Primary Examiner* — Eric Culbreth

(74) *Attorney, Agent, or Firm* — Morgan, Lewis & Bockius LLP (57) ABSTRACT

A center airbag cushion installed between left and right seats of a vehicle to protect a passenger from a shock generated by a side collision of the vehicle may include a first chamber part, a second chamber part comprising a left second chamber part and a right second chamber part respectively coupled to left and right sides of an upper end of the first chamber part to fluid-communicate therebetween, and a tension member provided on inner facing surfaces of the left and right second chamber parts, wherein the inner facing surfaces of the left and right second chamber parts face each other with a gap, and wherein the tension member has a rear end extending in a predetermined length rearwards and is fixed to a rear end of the first chamber part or the second chamber part therein.

6 Claims, 10 Drawing Sheets

CENTER AIRBAG CUSHION AND CENTER AIRBAG MODULE HAVING THE SAME

CROSS-REFERENCE TO RELATED APPLICATIONS

The present application claims priority to Korean Patent Application Number 10-2010-0057188 filed on Jun. 16, 2010, the entire contents of which application is incorporated herein for all purpose by this reference.

BACKGROUND OF THE INVENTION

1. Field of the Invention

The present invention relates to a center airbag cushion which is installed between the left and right seats of a vehicle to protect a passenger from a shock generated by a side collision of the vehicle, and a center airbag module having the center airbag cushion.

2. Description of Related Art

Generally, airbag systems include an impact sensor, an airbag module and an airbag control unit. The airbag systems are safety devices which are configured such that when a vehicle is involved in a collision, an airbag cushion installed in the airbag module is inflated by inflation gas to protect a driver or a passenger from shock. Such airbag systems have been developed to cope with front collisions of vehicles. Recently, center airbag systems and side airbag systems have been developed and used to cope with side collisions or vehicles overturning. A center airbag system is installed between the front left and right seats or the rear left and right seats to provide support to a passenger who is pushed to the left or the right when a vehicle is involved in a side collision and to prevent passengers from secondarily colliding with themselves.

Figure 1:
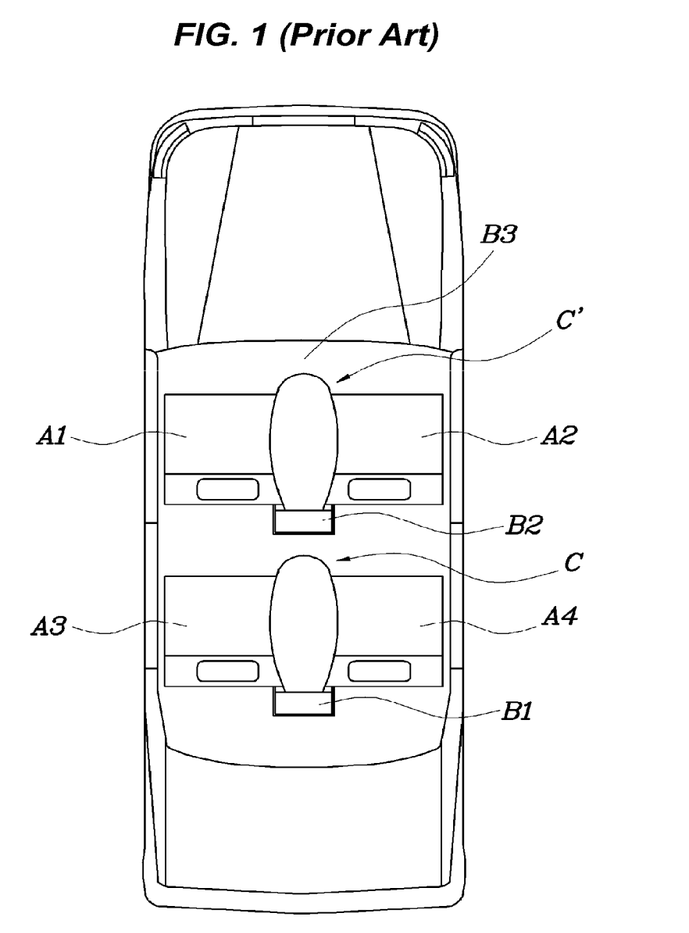
FIG. 1 is view showing a center airbag cushion and a center airbag module according to a conventional technique.

FIG. 1 is a view showing a vehicle equipped with conventional center airbag systems. The conventional center airbag system is installed between the front left and right seats A1 and A2 of the vehicle or between the rear left and right seats A3 and A4. The center airbag system may be disposed in a space B1 between the left and right seats, a center console compartment B2 or a central portion B3 of the dashboard. When a side collision of the vehicle occurs, the center airbag system deploys an airbag cushion C, C' to prevent the passenger on the left from excessively leaning to the right or to prevent the passenger on the right from excessively leaning to the left, thus preventing the passenger from being injured. Furthermore, the center airbag system prevents a secondary collision between the left and right seated passengers, thus preventing the passengers from suffering injuries due to secondary impacts.

The airbag cushion C, C' must have a structure and elasticity sufficient to absorb the shock applied from the passenger to the airbag cushion C, C'. Furthermore, the airbag cushion C, C' must have a support force sufficient to prevent the passenger from excessively leaning and colliding with another passenger. In other words, the center airbag system must be configured such that when the vehicle is involved in a side collision, the airbag cushion C, C' can maintain its correct position rather than excessively leaning in one direction and can thus reliably protect both passengers who are seated on the left seat and the right seat.

However, the conventional center airbag system is problematic in that the airbag cushion C, C' excessively leans in one direction because absorption of shock transmitted from the passenger to the airbag cushion C, C' is set as the main point, or the deployment force of the airbag cushion C, C' is insufficient or the airbag cushion C, C' cannot effectively absorb shock transmitted from the passenger thereto because supporting the passenger is set as the main point. Therefore, the conventional center airbag system cannot meet all the demanded criteria of superior shock absorption ability, sufficient support force and the airbag cushion being satisfactorily deployed.

The information disclosed in this Background of the Invention section is only for enhancement of understanding of the general background of the invention and should not be taken as an acknowledgement or any form of suggestion that this information forms the prior art already known to a person skilled in the art.

SUMMARY OF THE INVENTION

Various aspects of the present invention are directed to provide a center airbag cushion which effectively absorbs shock transmitted from a passenger, and is prevented from excessively leaning to the left or the right, thus preventing a secondary collision between passengers, and can ensure satisfactory deployment performance at the same time as it provides enhanced support ability, and a center airbag module including the center airbag cushion.

In an aspect of the present invention, the center airbag cushion installed between left and right seats of a vehicle to protect a passenger from a shock generated by a side collision of the vehicle may include a first chamber part; a second chamber part having a left second chamber part and a right second chamber part respectively coupled to left and right sides of an upper end of the first chamber part to fluid-communicate therebetween; and a tension member provided on inner facing surfaces of the left and right second chamber parts, wherein the inner facing surfaces of the left and right second chamber parts face each other with a gap, and wherein the tension member has a rear end extending in a predetermined length rearwards and is fixed to a rear end of the first chamber part or the second chamber part therein.

Rear end portions of the left second chamber part and the right second chamber part may be fluid-connected each other.

Front ends of the left and right second chamber parts may be united together to form a united portion so that the left and right second chamber parts are prevented from moving away from each other in opposite directions.

The tension member may include a pair of tension parts respectively provided on the inner facing surfaces of the left and right second chamber parts, the tension parts respectively having rear ends extending in a predetermined length and being united together, and a support part disposed in the first chamber part, wherein the support part is connected at a front end thereof to the rear ends of the pair of the tension parts and has a rear end extending in a predetermined length and fixed to an inner surface of the first chamber part.

The pair of tension parts may respectively form the inner facing surfaces of the left and right second chamber parts.

The pair of tension parts may respectively form a portion of the inner facing surfaces of the left and right second chamber parts.

The pair of tension parts may have band shapes, and front ends of the tension parts are respectively fixed to front ends of the left and right second chamber parts.

The pair of tension parts may extend across the central portion of the left and right second chamber parts.

Rear ends of the pair of tension parts and the front end of the support part may be united together to a fabric of the center airbag cushion between lower portions of the left and right second chamber parts.

In another aspect of the present invention, the center airbag module installed between left and right seats of a vehicle to protect a passenger from a shock generated by a side collision of the vehicle may include a housing, an inflator installed in the housing, an airbag cushion connected to the inflator, and including, a first chamber part, a second chamber part connected to an upper end of the first chamber part, wherein the second chamber part includes a left second chamber part and a right second chamber part, and a tension member provided on inner facing surfaces of the left and right second chamber parts, wherein the tension member has a rear end extending in a predetermined length rearwards and being fixed to a rear end of the first chamber part or the second chamber part, and has a front end fixed to front ends of the first and second chamber parts.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a center airbag cushion according to an embodiment of the present invention will be described in detail with reference to the attached drawings.

Figure 2:
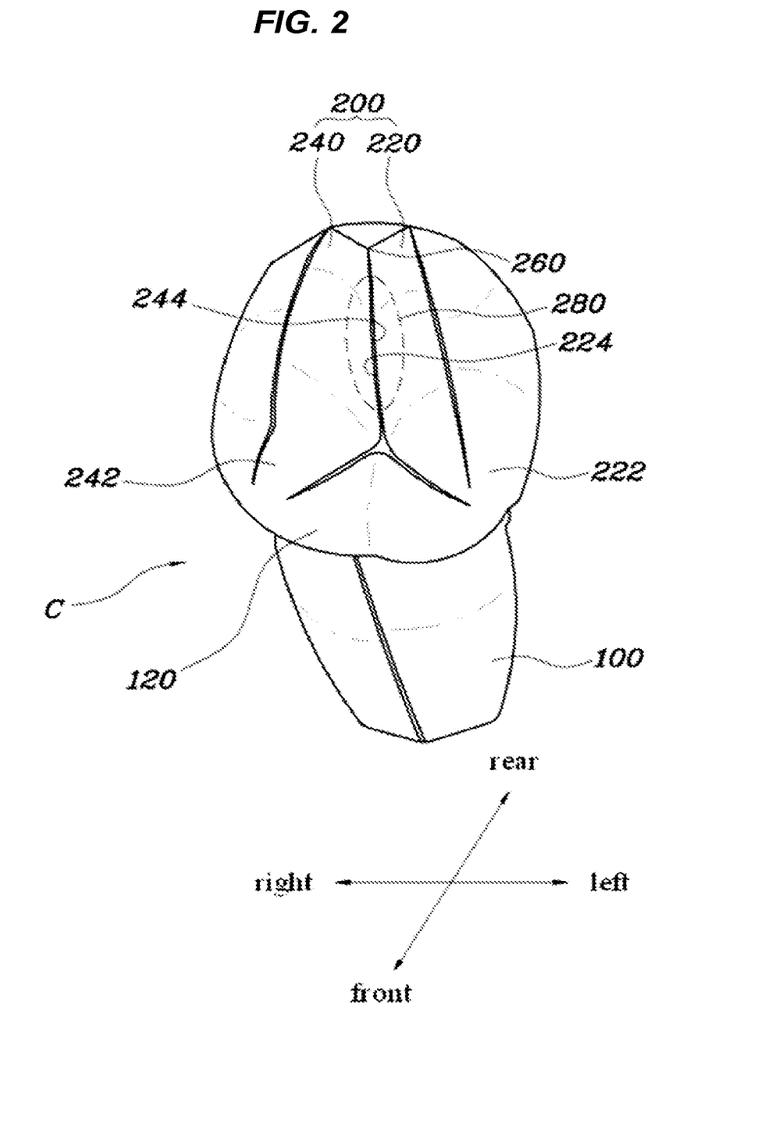
FIG. 2 is a front view of an exemplary center airbag cushion, according to the present invention.
Figure 3:
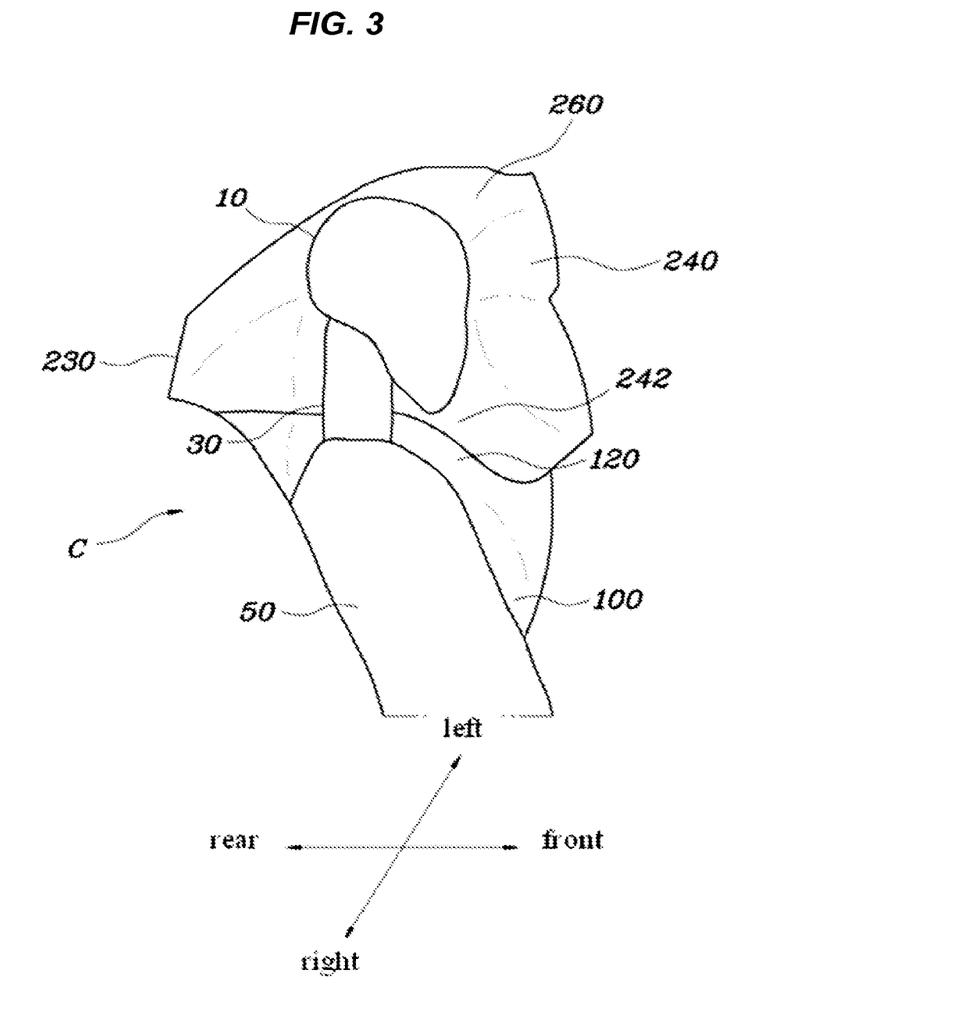
FIG. 3 is a side view of the center airbag cushion of FIG. 2.

FIG. 2 is a front view of a center airbag cushion C, according to an embodiment of the present invention. FIG. 3 is a side view of the center airbag cushion C.

The center airbag cushion C according to an exemplary embodiment of the present invention is installed between left and right seats of a vehicle to protect passengers when the vehicle is in a side collision. The center airbag cushion C includes a first chamber part 100, a second chamber part 200 and a tension member 300. The second chamber part 200 includes a left second chamber part 220 and a right second chamber part 240 which are respectively connected to a left side and a right side of an upper end 120 of the first chamber part 100. The tension member 300 is provided on inner facing surfaces 224 and 244 of the left and right second chamber parts 220 and 240. A rear end of the tension member 300 extends a predetermined length rearward and is fixed to the first chamber part 100 or the second chamber part 200.

The center airbag cushion C must be able to support a passenger who is pushed in a lateral direction when the vehicle is involved in a side collision. For this, the cushion C must form a shape corresponding to a side body line of the passenger when the cushion C is inflated.

In detail, the first chamber part 100 supports a chest 50 and a shoulder of the passenger. The second chamber part 200 supports a head 10 of the passenger. When the cushion C inflates, the second chamber part 200 protrudes more than the first chamber part 100 to support the head 10 and the chest 50 at the same time. Thus, the left and right second chamber parts 220 and 240 are respectively provided on the left and right sides of the upper end 120 of the first chamber part 100 and have an area larger than that of the first chamber part 100. However, if the left and right second chamber parts 220 and 240 excessively protrude to the left and the right, the left or right second chamber part 220 or 240 may strike the head 10 of the passenger before the first chamber part 100 comes into contact with the chest 50. Thereby, the neck 30 of the passenger may be bent. Therefore, it is desirable that upper portions of the left and right second chamber parts 220 and 240 be united together to form a united portion 260, thus preventing the left and right second chamber parts 220 and 240 from moving away from each other in opposite directions. The united portion 260 may be formed by sewing the upper portions of the left and right second chamber parts 220 and 240. Due to the united portion 260, the center airbag cushion C has a reversed egg shaped section in general. As shown in FIG. 3, the center airbag cushion C has a shape corresponding to the side body line of the passenger to more reliably support the passenger and prevent the passenger from being injured, for example, prevent the neck 30 from being bent, by the airbag cushion C.

Furthermore, in the center airbag cushion C according to the embodiment of the present invention, the inner facing surfaces 224 and 244 of the left and right second chamber parts 220 and 240 may not be in close contact with each other such that a space 280 is defined between the inner facing surfaces 224 and 244. Thus, each of the left and right second chamber parts 220 and 240 can independently move, so that when a collision occurs, it can effectively and actively cope with movement of the passenger. Lower portions 222 and 242 of the left and right second chamber parts 220 and 240 are coupled to the upper end 120 of the first chamber part 100. The lower portions 222 and 242 of the left and right second chamber parts 220 and 240 may communicate with the upper end 120 of the first chamber part 100. In this case, an airbag inflator may be connected to either of the first chamber part 100 or the second chamber part 200, and when the inflator deploys the airbag, the first and second chamber part 100 and 200 can be deployed at the same time.

Figure 4A:
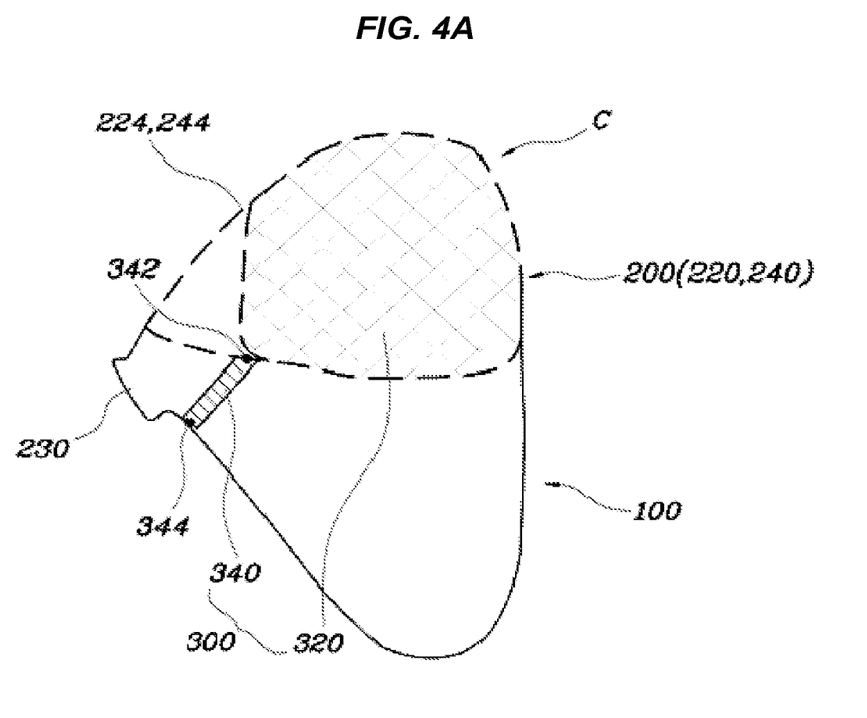
FIGS. 4A and 4B are sectional views of the center airbag cushion of FIG. 2.
Figure 4B:
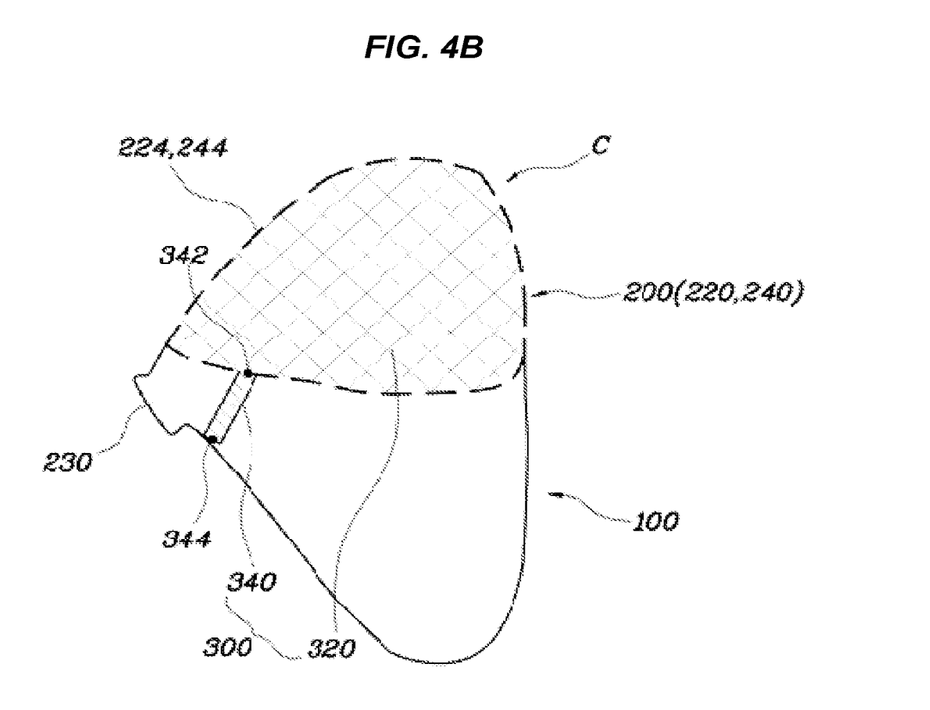

FIGS. 4A and 4B are sectional views showing two examples of the center airbag cushion C of FIG. 2. The tension member 300 is provided on the inner facing surfaces 224 and 244 of the left and right second chamber parts 220 and 240. The rear end 344 of the tension member 300 extends rearwards and is fixed to the rear portion of the first or second chamber part 100 or 200. As such, because the tension member 300 is fixed to the rear portion of the first or second chamber part 100 or 200, when a shock is applied to the cushion, the tension member 300 pulls the left or right second chamber part 220 or 240 around the fixed point. Thereby, the entire cushion can be prevented from shaking from side to side. The tension member includes a pair of tension parts 320 and a support part 340. The tension parts 320 are respectively provided on the inner facing surfaces 224 and 244 of the left and right second chamber parts 220 and 240. Rear ends 324 of the tension parts 320 extend in a predetermined length rearwards and are united together. The support part 340 is disposed inside the first chamber part 100. A front end 342 of the support part 340 is connected to the rear ends 324 of the tension parts 320. A rear end 344 of the support part 340 extends a predetermined length and is fixed to the inner surface of the first chamber part 100. The tension parts 320 may be provided on the inner or outer side of the inner facing surfaces 224 and 244 of the left and right second chamber parts 220 and 240. Alternatively, the tension parts 320 may form the entirety or a portion of the inner facing surfaces 224 and 244.

FIG. 4A shows an example of a tension part 320 which forms a portion of the facing surface 224, 244. FIG. 4B shows an example of a tension part 320 which forms the entirety of the facing surface 224, 244. Each tension part 320 may be united to a fabric of the corresponding second chamber part 220 or 240 by sewing. When a shock is applied to the cushion C, the tension parts 320 support the second chamber parts 220 and 240 in such a way as to pull the entirety of the fabric of the second chamber parts 220 and 240 which are united to the perimeters of the tension parts 320.

As such, the tension member 300 is provided on the inner facing surfaces of the left and right second chamber parts 220 and 240, and the rear end of the tension member 300 extends a predetermined length and is fixed to the first or second chamber part 100 or 200. Therefore, the tension member 300 may be made of a single material and manufactured into a single body. The rear end of the tension member 300 may be fixed to the first or second chamber part 100 or 200 through the interior of the airbag cushion C. Alternatively, the rear end of the tension member 300 may extend along the outer surface of the airbag cushion C rearwards and then be fixed to the first or second chamber part 100 or 200. In the case of FIGS. 4A and 4B, the tension member 300 includes the tension parts 320 and the support part 340. The support part 340 is disposed inside the first chamber part 100. The front end 342 of the support part 340 is connected to the rear ends 324 of the tension parts 320, and the rear end 344 of the support part 340 extends a predetermined length and is fixed to the rear end of the inner surface of the first chamber part 100.

Figure 5A:
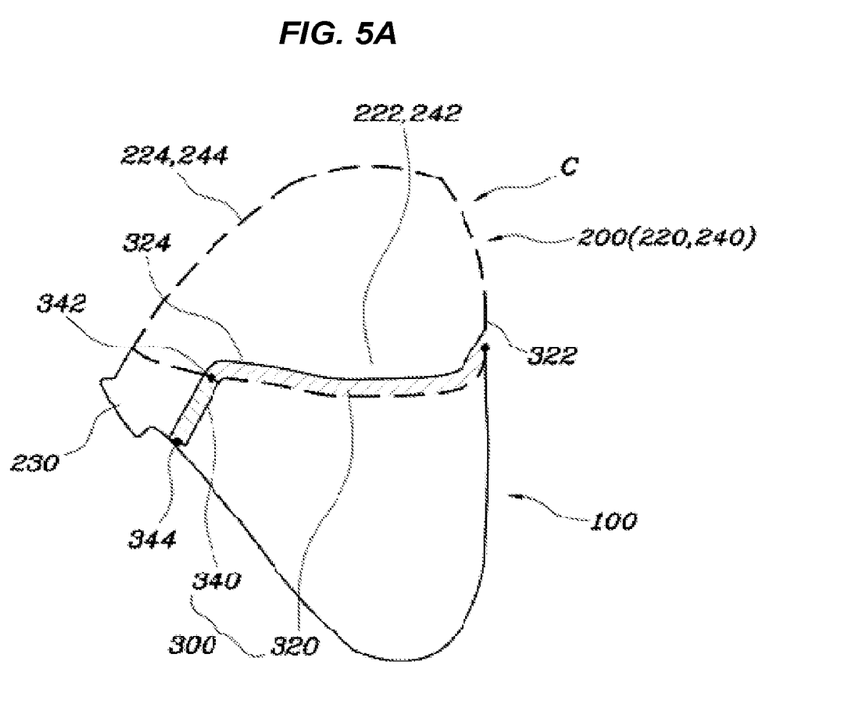
FIGS. 5A and 5B are sectional views of am exemplary center airbag cushion, according to the present invention.
Figure 5B:
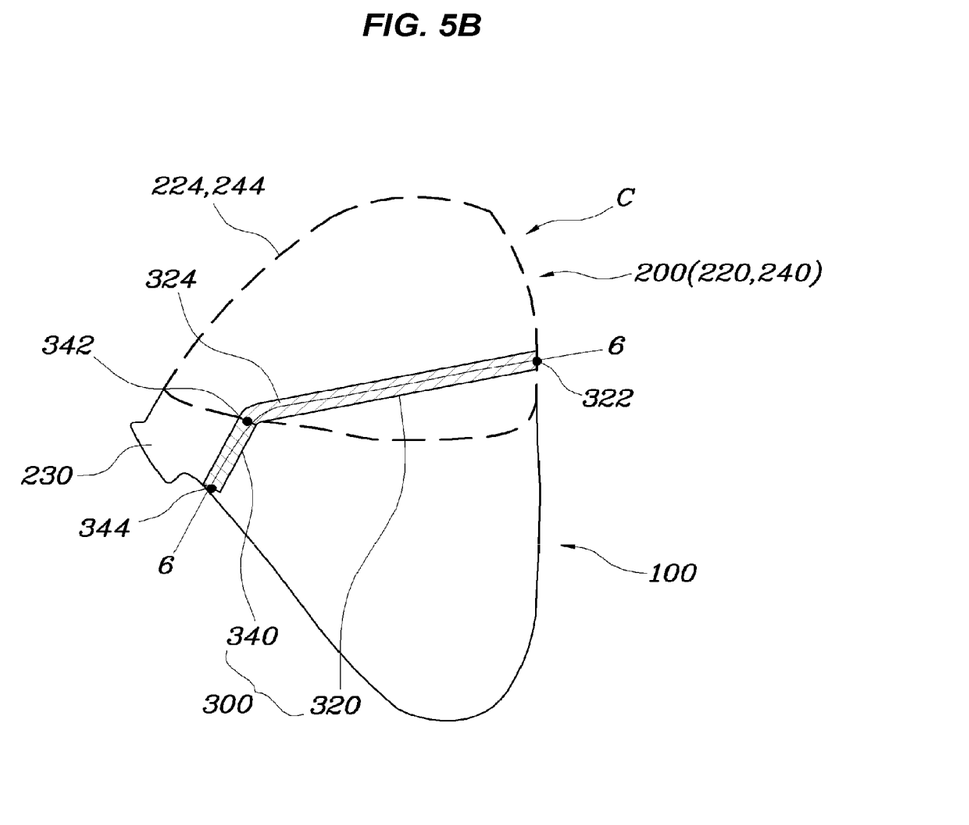

FIGS. 5A and 5B are sectional views showing a center airbag cushion C, according to another embodiment of the present invention. In the present embodiment, two tension parts 320 of a tension member 300 are respectively provided on the inner facing surfaces 224 and 244 of the left and right second chamber parts 220 and 240. Each tension part 320 has a band shape. Front ends 322 of the tension parts 320 are respectively fixed to front ends 226 and 246 of the left and right second chamber parts 220 and 240. Rear ends 324 of the tension parts 320 are connected to a front end 342 of a support part 340 of the tension member 300. A rear end 344 of the support part 340 is connected to the rear end of the first chamber part 100. The rear ends 324 of the tension parts 320 are united to the fabric of the cushion between lower portions 222 and 242 of the left and right second chamber parts 220 and 240. The front end 342 of the support part 340, along with the rear ends 324 of the tension parts 320, are united to the fabric of the cushion between lower portions 222 and 242 of the left and right second chamber parts 220 and 240. The tension parts 320 are installed on the respective second chamber parts 220 and 240 and the support part 340 can be disposed inside the first chamber part 100 by the above-mentioned method of unifying them. Because the tension parts 320 are coupled to the support part 340 and formed into a single body, tension can be applied to the second chamber parts 220 and 240 when a shock is applied to the cushion C. FIG. 5A shows an example of a tension part 320 which extends along the lower end of the second chamber part 220, 240. FIG. 5B shows an example of a tension part 320 which extends across the central portion of the second chamber part 220, 240. Installation positions of the tension parts 320 may be determined depending on the shape of the airbag cushion C and designed to take into account the position of the passenger.

As stated above, the tension member 300 may be made of a single material. Alternatively, the tension member 300 may be made of two materials including the material of the tension part 320 and the material of the support part 340. Furthermore, each tension part 320 may form the entirety or a portion of the facing surface 224, 244 of the corresponding second chamber part 220, 240. Particularly, the tension part 320 may have a band shape and be configured such that the front end 322 thereof is fixed to the front end of the second chamber part 220, 240. It is desirable that the support part 340 be made of material having heat resistance to prevent it from being damaged by high-temperature and high-pressure gas when the support part 340 is coupled to the cushion C around a portion 230 to which the inflator is connected.

Figure 6:
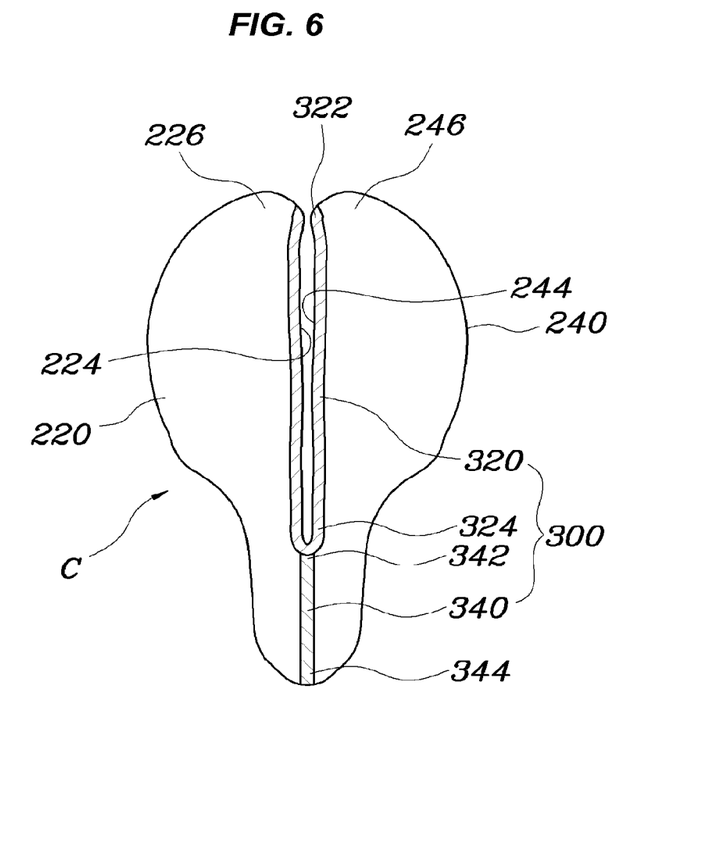
FIG. 6 is a sectional view taken along line 6-6 of FIG. 5B.

FIG. 6 is a sectional view taken along line 6-6 of FIG. 5B. As stated above, the second chamber part 200 includes the two second chamber parts 220 and 240 which are disposed at the left and right sides. The tension parts 320 are provided on the respective inner facing surfaces 224 and 244. The front ends 322 of the tension parts 320 are fixed to the front ends 226 and 246 of the second chamber parts 220 and 240. The rear ends 324 of the tension parts 320 are fixed to the junction between the second chamber parts 220 and 240. The support part 340 is installed in the first chamber part 100 and configured such that the front end 342 of the support part 340 is fixed to the rear ends 324 of the tension parts 320 and the rear end 344 of the support part 340 is fixed to the rear end of the first chamber part 100.

Figure 7:
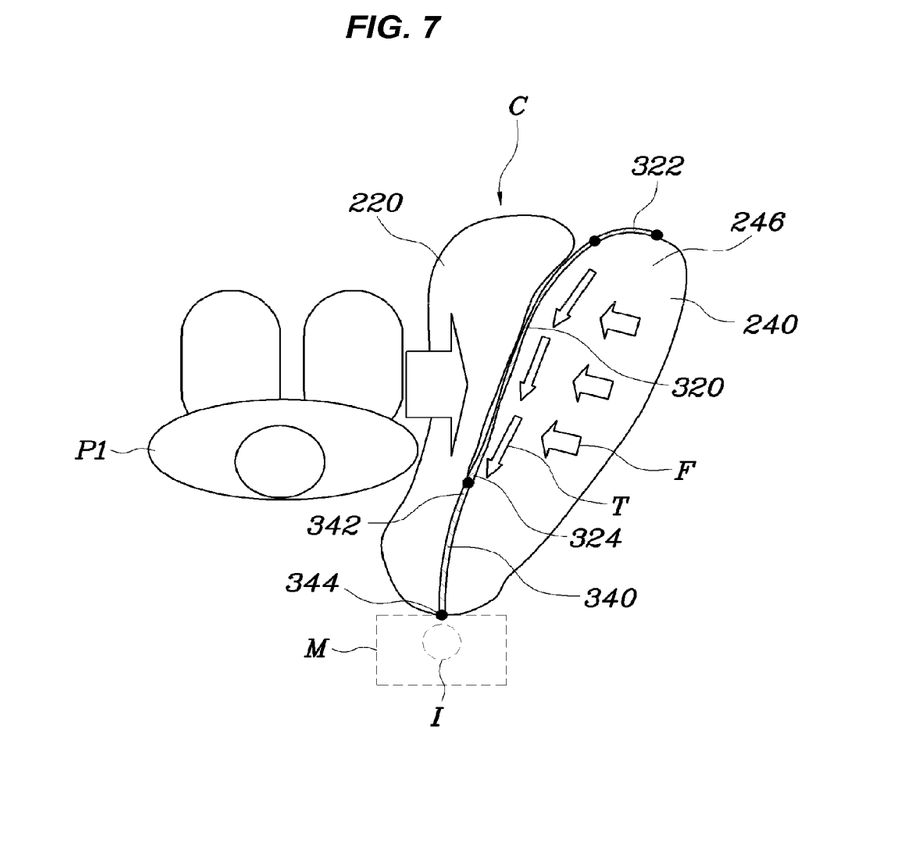
FIG. 7 is a view showing deformation of the center airbag cushion of FIG. 5B when left shock is applied thereto.

FIG. 7 is a view showing a state of tension applied to the center airbag cushion C when a left passenger P1 collides with the center airbag cushion C. When a shock is applied to the left side of the vehicle, the passenger P1 is moved to the right and applies a shock to the airbag cushion C. At this time, the airbag cushion C is pushed to the right by the collision with the passenger P1. If the airbag cushion C has no support force acting in the opposite direction, the airbag cushion C is excessively pushed to the right rather than supporting the passenger P1. In this case, the left passenger P1 may collide with a right passenger because the airbag cushion C cannot support the left passenger P1 who is being pushed to the right by the collision of the vehicle.

The tension member 300 of the present invention is provided to avoid the above-mentioned problem. The tension member 300 is provided on the inner facing surfaces of the second chamber parts 220 and 240, thus providing support force to the airbag cushion C. In detail, when the left passenger P1 collides with the airbag cushion C, the airbag cushion C is pushed to the right. Here, in the present invention, the tension part 320 is provided on the outer surface of the right second chamber part 240 and the front end 322 and the rear end 324 of the tension part 320 are fixed to the right second chamber part 240. Thus, the front end 322 of the tension part 320 is pulled on the basis of the rear end 344 of the support part 340, so that tension T is applied to the tension part 320. Because of the tension T, the front end 320 of the tension part 320 pulls the front end 246 of the right second chamber part 240. Thereby, a counterclockwise moment F is applied to the right second chamber part 240, so that the entire airbag cushion C is biased to the left. Therefore, when the left collision occurs, the airbag cushion C is pushed to the right but the force F for biasing the airbag cushion C towards the center is applied to the airbag cushion C by the tension part 320. As a result, the airbag cushion C can reliably support the left passenger P1 such that the left passenger P1 is prevented from being excessively pushed to the right. Furthermore, because the tension parts 320 are provided on the inner facing surfaces of the second chamber parts 220 and 240, when the inflator I deploys the airbag, the tension parts 320 do not impede deployment of the airbag cushion C. Therefore, the present invention can reliably ensure the inflation force of the airbag cushion C, shock absorption performance and the force required to support the passenger.

Figure 8:
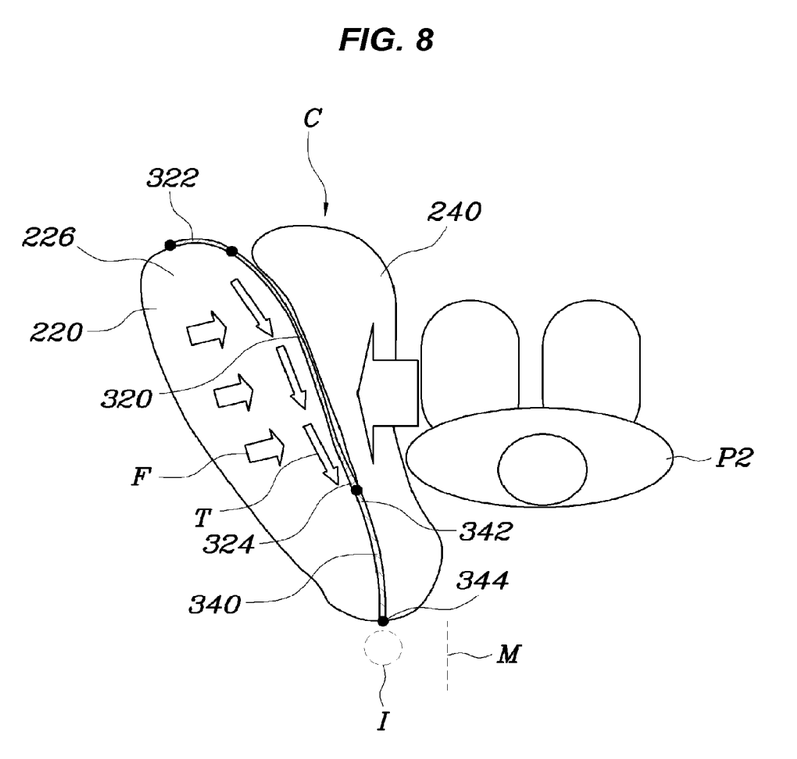
FIG. 8 is a view showing deformation of the center airbag cushion of FIG. 5B when right shock is applied thereto.

FIG. 8 is a view showing a state of tension applied to the center airbag cushion C when a right passenger P2 collides with the center airbag cushion C. In the same manner as the case of FIG. 7, when the right passenger P2 collides with the airbag cushion C, tension T is applied to the tension part 320 that is provided on the left second chamber part 220. Thereby, force for biasing the left second chamber part 220 to the right is applied to the left second chamber part 220. Thus, the airbag cushion C can reliably support the right passenger P2 such that the passenger P2 is prevented from being excessively pushed to the left.

Meanwhile, a center airbag module according to an embodiment of the present invention includes a housing M, an inflator I and a center airbag cushion C. The housing M is installed in an inner panel between the left and right seats. The inflator I is installed in the housing M to apply the force of inflation to the airbag cushion C. The airbag cushion C is connected to the inflator I in the housing M. As mentioned above, the airbag cushion C includes a first chamber part 100, a second chamber part 200 and a tension member 300. The second chamber part 200 includes a left second chamber part 220 and a right second chamber part 240 which are respectively connected to a left side and a right side of an upper end 120 of the first chamber part 100. The tension member 300 is provided on inner facing surfaces 224 and 244 of the left and right second chamber parts 220 and 240. A rear end of the tension member 300 extends a predetermined length rearward and is fixed to the first chamber part 100 or the second chamber part 200 so that the tension member 300 applies the support force to the airbag cushion C in a direction opposite to a direction in which a passenger collides with the airbag cushion C.

As described above, the present invention provides a center airbag cushion and a center airbag module having the same. The airbag cushion has a shape corresponding to a body shape of a passenger, that is, a side body line of the head, the neck and the shoulder of the passenger. Thus, the airbag cushion can effectively absorb shock.

Furthermore, when a vehicle collision occurs, appropriate tension is applied to the airbag cushion to restrict the airbag cushion from excessively moving to the left or the right. Therefore, the airbag cushion can reliably support the passenger and prevent a secondary collision between passengers.

Moreover, because a tension member for applying tension to the airbag cushion is disposed inside the airbag cushion, the deployment performance of the airbag cushion can be prevented from deteriorating despite having the tension member.

For convenience in explanation and accurate definition in the appended claims, the terms "upper", "lower", "inner" and "outer," "front", and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A center airbag cushion installed between left and right seats of a vehicle to protect a passenger from a shock generated by a side collision of the vehicle, the center airbag cushion comprising:
   a first chamber part;
   a second chamber part having a left second chamber part and a right second chamber part respectively coupled to left and right sides of an upper end of the first chamber part to fluid-communicate therebetween; and
   a tension member provided on inner facing surfaces of the left and right second chamber parts, wherein the inner facing surfaces of the left and right second chamber parts face each other with a gap, and wherein the tension member has a rear end extending in a predetermined length rearwards and is fixed to a rear end of the first chamber part or the second chamber part therein;
   wherein the tension member comprises:
      a pair of tension parts respectively provided on the inner facing surfaces of the left and right second chamber parts, the tension parts respectively having rear ends extending in a predetermined length and being united together; and
      a support part disposed in the first chamber part, wherein the support part is connected at a front end thereof to the rear ends of the pair of the tension parts and has a rear end extending in a predetermined length and fixed to an inner surface of the first chamber part;
   wherein the pair of tension parts have band shapes, and front ends of the tension parts are respectively fixed to front ends of the left and right second chamber parts, and wherein rear ends of the pair of tension parts and the front end of the support part are united together to a fabric of the center airbag cushion between lower portions of the left and right second chamber parts.

2. The center airbag cushion as set forth in claim 1, wherein rear end portions of the left second chamber part and the right second chamber part are fluid-connected each other.

3. The center airbag cushion as set forth in claim 1, wherein front ends of the left and right second chamber parts are united together to form a united portion so that the left and right second chamber parts are prevented from moving away from each other in opposite directions.

4. The center airbag cushion as set forth in claim 1, wherein the pair of tension parts respectively forms the inner facing surfaces of the left and right second chamber parts.

5. The center airbag cushion as set forth in claim 1, wherein the pair of tension parts respectively forms a portion of the inner facing surfaces of the left and right second chamber parts.

6. The center airbag cushion as set forth in claim 1, wherein the pair of tension parts extends across the central portion of the left and right second chamber parts.

\* \* \* \* \*